(12) United States Patent
Cooper et al.

(10) Patent No.: US 7,049,025 B2
(45) Date of Patent: May 23, 2006

(54) GAS DIFFUSION SUBSTRATE

(75) Inventors: Susan Joy Cooper, Reading (GB); John Malcolm Gascoyne, Bucks (GB); Thomas Robertson Ralph, Reading (GB); Karen Leanne Hogarth, Reading (GB)

(73) Assignee: Johnson Matthey Public Limited Company, London (GB)

( * ) Notice: Subject to any disclaimer, the term of this patent is extended or adjusted under 35 U.S.C. 154(b) by 220 days.

(21) Appl. No.: 10/416,049

(22) PCT Filed: Nov. 2, 2001

(86) PCT No.: PCT/GB01/04868

§ 371 (c)(1),
(2), (4) Date: Sep. 18, 2003

(87) PCT Pub. No.: WO02/39526

PCT Pub. Date: May 16, 2002

(65) Prior Publication Data
US 2004/0058123 A1 Mar. 25, 2004

(30) Foreign Application Priority Data
Nov. 7, 2000 (GB) .................... 0027119

(51) Int. Cl.
| H01M 4/96 | (2006.01) |
| B32B 9/00 | (2006.01) |
| B32B 27/04 | (2006.01) |
| D04H 1/00 | (2006.01) |
| D04H 13/00 | (2006.01) |

(52) U.S. Cl. .............. 429/42; 429/44; 429/34; 429/30; 428/367; 428/297.4; 428/105; 442/341; 442/327; 442/334; 442/361; 442/344; 442/349

(58) Field of Classification Search .............. 429/42, 429/44, 34, 30; 428/367, 297.4; 442/341, 442/327, 334, 361, 344, 349
See application file for complete search history.

(56) References Cited

U.S. PATENT DOCUMENTS

| 4,687,607 A | 8/1987 | Shigeta et al. |
| 4,759,989 A | 7/1988 | Abe et al. |
| 6,677,073 B1 * | 1/2004 | Brown et al. .......... 429/42 |
| 2003/0134179 A1 * | 7/2003 | Gascoyne et al. ...... 429/44 |

FOREIGN PATENT DOCUMENTS

| EP | 0 226 280 A1 | 6/1987 |
| EP | 0 287 945 A2 | 10/1988 |
| EP | 0 791 974 A1 | 8/1997 |
| EP | 0791974 A1 * | 8/1997 |
| EP | 0 928 036 A1 | 7/1999 |
| EP | 0 942 482 A2 | 9/1999 |
| EP | 0 731 520 B1 | 5/2001 |
| WO | WO-96/33520 | 10/1996 |
| WO | WO-98/27606 | 6/1998 |
| WO | WO-00/47816 | 8/2000 |
| WO | WO-00/55933 | 9/2000 |
| WO | WO-02/22952 A2 | 3/2002 |

OTHER PUBLICATIONS

Copy of International Search Report dated Apr. 18, 2002, from International Application No. PCT/GB01/04868.
Copy of British Search Report dated Feb. 23, 2001, from United Kingdom Application No. 0027119.7.

* cited by examiner

Primary Examiner—Patrick Joseph Ryan
Assistant Examiner—Angela J. Martin
(74) Attorney, Agent, or Firm—RatnerPrestia

(57) ABSTRACT

A novel flexible non-woven carbon fibre gas diffusion substrate comprising a plurality of first carbon fibres orientated in the x-, y- and optionally z-directions, said first fibres being bonded with a thermoplastic polymeric substance, and a carbon based filler material, characterised, in that the flexible non-woven carbon fibre gas diffusion substrate has a total density of greater than $0.35$ g/cm$^3$, and a gas diffusion electrode obtained therefrom is disclosed. Also disclosed is a process for the manufacture of the substrate and electrode.

17 Claims, No Drawings

GAS DIFFUSION SUBSTRATE

This application is the U.S. national phase application of PCT International Application No. PCT/GB01/04868.

The present invention relates to a novel flexible non-woven carbon fibre gas diffusion substrate with a density greater than 0.35 g/cm$^3$ and a gas diffusion electrode obtained therefrom. The invention further relates to a process for the manufacture of the substrate and electrode.

Electrochemical cells invariably comprise at their fundamental level a solid or liquid electrolyte and two electrodes, the anode and cathode, at which the desired electrochemical reactions take place. A fuel cell is an energy conversion device that efficiently converts the stored chemical energy of its fuel into electrical energy by combining either hydrogen, stored as a gas, or methanol stored as a liquid or gas, with oxygen to generate electrical power. The hydrogen or methanol is oxidised at the anode and oxygen is reduced at the cathode. In these cells gaseous reactants and/or products have to be diffused into and/or out of the cell electrode structures. The electrodes therefore are specifically designed to be porous to gas diffusion in order to optimise the contact between the reactants and the reaction sites in the electrode to maximise the reaction rate. The electrolyte also has to be in contact with both electrodes and in fuel cell devices may be acidic or alkaline, liquid or solid, in nature. In the proton exchange membrane fuel cell (PEMFC), whether hydrogen or methanol fuelled, the electrolyte is a solid proton-conducting polymer membrane, commonly based on perfluorosulphonic acid materials. The PEMFC is the most likely type of fuel cell to find wide application as a more efficient and lower emission power generation technology in a range of markets including stationary and portable power generation devices and as alternative engines to the internal combustion engine in transportation.

In the PEMFC the combined laminate structure formed from the membrane and the two electrodes is known as a membrane electrode assembly (MEA). The MEA will typically comprise several layers, but can in general be considered, at its basic level, to have five layers which are defined principally by their function. On either side of the membrane an anode and cathode electrocatalyst is incorporated to increase the rates of the desired electrode reactions. In contact with the electrocatalyst containing layers, on the opposite face to that in contact with the membrane, are the anode and cathode gas diffusion substrate layers. The anode gas diffusion substrate is designed to be porous and to allow the reactant hydrogen or methanol to enter from the face of the substrate exposed to the reactant fuel supply, and then to diffuse through the thickness of the substrate to the layer which contains the electrocatalyst, usually platinum metal based, to maximise the electrochemical oxidation of hydrogen or methanol. The anode electrocatalyst layer is also designed to comprise some level of the proton conducting electrolyte in contact with the same electrocatalyst reaction sites. With acidic electrolyte types the product of the anode reaction are protons and these can then be efficiently transported from the anode reaction sites through the electrolyte to the cathode layers. The cathode gas diffusion substrate is also designed to be porous and to allow oxygen or air to enter the substrate and diffuse through to the electrocatalyst layer reaction sites. The cathode electrocatalyst combines the protons with oxygen to produce water and is also designed to comprise some level of the proton conducting electrolyte in contact with the same electrocatalyst reaction sites. Product water then has to diffuse out of the cathode structure. The structure of the cathode has to be designed such that it enables the efficient removal of the product water. If water builds up in the cathode, it becomes more difficult for the reactant oxygen to diffuse to the reaction sites, and thus the performance of the fuel cell decreases. In the case of methanol fuelled PEMFCs, additional water is present due to the water contained in the methanol, which can be transported through the membrane from the anode to the cathode side. The increased quantity of water at the cathode requires removal. However, it is also the case with proton conducting membrane electrolytes, that if too much water is removed from the cathode structure, the membrane can dry out and the performance of the fuel cell also decreases.

The complete MEA can be constructed by several methods. The electrocatalyst layers can be bonded to one surface of the gas diffusion substrates to form what is known as a gas diffusion electrode. The MEA is then formed by combining two gas diffusion electrodes with the solid proton-conducting membrane. Alternatively, the MEA may be formed from two porous gas diffusion substrates and a solid proton-conducting polymer membrane catalysed on both sides; or indeed the MEA may be formed from one gas diffusion electrode and one gas diffusion substrate and a solid proton-conducting polymer catalysed on the side facing the gas diffusion substrate.

A PEM fuel cell assembly comprises a plurality of such MEA's individually set between bipolar plates, which are also known as flow field plates. The bipolar plates are rigid, electrically conductive separator plates that have typically been formed of graphite although more recently conductive carbon/polymer composites and metal-based versions have been developed as part of the drive towards cheaper and more readily mass manufactured components. They are fabricated with surface features that comprise at least one continuous flow passage or groove engraved, milled or moulded in the surface over the entire surface facing the electrocatalysed area of the MEA. The flow passage, or passages, in the separator plates direct the fuel and oxidant to the respective electrodes, namely, the anode on the fuel side and the cathode on the oxidant side.

In a bipolar fuel cell stack arrangement the separator plates are double sided with the flow passages on one side supplying the oxidant to the cathode of one MEA and the flow passages on the other side supplying the fuel to the anode of the adjacent MEA. The separator plates, under pressure, intimately contact the respective electrodes to perform several functions: (1) they act as current collectors over the entire surface of the gas diffusion substrate, (2) they provide mechanical support for the gas diffusion substrates, (3) they provide access channels for the fuel and oxidant to the respective anode and cathode surfaces, (4) they provide channels for the removal of water formed during operation of the cell and (5) they provide the surfaces for the sealing gaskets around the edges of the MEA which ensure that the system is gas tight and any other porting within the cell is also sealed.

In order for the stack structure to function efficiently it is important that the electrical contact through the structure is maximised and that the efficiency of the gas flows through the channels in the flow field plates are not obstructed. Traditionally, the gas porous substrates used in PEMFC were based on high-density materials such as rigid carbon fibre paper (i.e. Toray TGP-H-60 or TGP-H-90 from Toray Europe Ltd., 7 Old Park Lane, London, W1Y 4AD), with a bulk density of 0.46 g/cm$^3$. These rigid high-density materials are formed from sheets of non-woven carbon fibre or precursor polymer fibres that have been impregnated with a resin binder (such as an epoxy or phenolic resin). The sheets, so treated, are pressure bonded together to produce the required thickness of material and then heat treated to temperatures in excess of 800° C. to carbonize the whole structure. Due to the inherent stiffness of the rigid high density materials, such as Toray paper, good contact with the surface of the field flow plate is obtained and the paper does not distort into the channels, under the pressures normally applied to the stack to obtain good electrical conductivity and form gas tight seals between all the components. Unfortunately the very rigidity that previously prevented problems with distortion into the channels is a major constraint to using the material for the large volume, high speed, production processes that will be required for commercialisation of fuel cells. As a consequence there has been a move towards developing more flexible materials, for the gas diffusion layers, that can be handled on web fed equipment. Various flexible, carbon composite, materials based on non-woven carbon webs, have been described by Gascoyne et al., in EP 0 791 974, EP 0 942 482 and WO 00/47816. These materials can be produced in continuous lengths and lend themselves to web type processes. Other flexible, web based materials, utilising carbon black as the electrically conductive medium have been described by Campbell et al., in WO 98/27606. Carbon cloth based materials also offer an option for web fed processes and typical examples of these materials have been described by Linstrom in EP 0 226 280 and De Castro et al., in EP 0 928 036.

Gas diffusion electrodes based on carbon cloth or carbon black filled structures are, in general, considerably more compressible than the conventional rigid, carbon fibre paper based electrodes and hence have a tendency to distort into the channels in the flow field plates under the pressures normally applied to stack assemblies. This distortion has the effect of reducing the cross-sectional area of the channel and hence has a deleterious effect upon the gas flow within the channel.

The object of the present invention is therefore to provide a flexible non-woven carbon fibre gas diffusion substrate capable of being produced by high volume manufacture, but which avoids the problems of distortion associated with the non-woven substrates mentioned above.

Accordingly, the present invention provides a flexible non-woven carbon fibre gas diffusion substrate comprising a plurality of first carbon fibres orientated in the x-, y- and optionally z-directions, said first fibres being bonded with a thermoplastic polymeric substance, and a carbon based filler material, characterised in that the flexible non-woven carbon fibre gas diffusion substrate has a total density of greater than 0.35 g/cm$^3$. Preferably, the total density is greater than 0.4 g/cm$^3$.

In the present invention, the term "total density" means the total density of fibres, thermoplastic polymeric substance and carbon based filler material in the gas diffusion substrate; the density is the total weight per unit volume.

The first fibres are of carbon and are suitably selected from the group consisting of longer fibres and shorter fibres, or a combination of longer and shorter fibres. The longer fibres are of average length greater than 3 mm and suitably have a maximum average length of 50 mm. The preferred average length of the fibres is 5 mm to 30 mm. The diameter of the longer fibres is typically in the range of 0.2 microns to 25 microns, preferably in the range of 2 microns to 20 microns. The shorter fibres have an average length of less than 3 mm, suitably are of average length less than 2 mm, preferably less than 1 mm. The shorter fibres have a minimum length of 50 microns, preferably 100 microns. The diameter of-the shorter fibres is typically in the range 0.1 microns to 20 microns, preferably 0.4 microns to 10 microns.

The first fibres in the non-woven carbon fibre gas diffusion substrate are held together by one or more thermoplastic polymeric substances (the "final polymer"). Depending on the polymeric substance(s) used it may also contribute to the essential electrode structural properties in the gas diffusion substrate, such as tensile strength, flexibility and control of the hydrophobic/hydrophilic balance. Examples of such polymers include polytetrafluoroethylene (PTFE), fluorinated ethylene-propylene (FEP), polyvinylidene difluoride (PVDF), Viton A, polyethylene, polypropylene, ethylene-propylene. The preferred final polymer is PTFE or FEP.

In addition to the first fibres, one or more continuous strands comprising a plurality of second carbon fibres may be embedded within the non-woven carbon fibre gas diffusion substrate. The second fibres in the one or more continuous strands may be present in the form of a tow or yarn. A tow is an essentially parallel collection of synthetic fibres preparatory to spinning, and a yarn is a continuous twisted strand of two or more fibres. When two or more continuous strands are embedded within the substrate, the fibres in each continuous strand may be in the form of a tow or yarn, or a combination thereof.

The or each continuous strand(s) are made up of a plurality of second carbon fibres, and suitably comprise at least 100 fibres. The total number of carbon fibres in each strand will depend on the required thickness of the substrate and the application for which it is to be used. The maximum length of the second fibres is determined by the dimensions of the substrate and the orientation of the continuous strand within the substrate. For example, the continuous strand may extend from one edge of the substrate to any one of the other edges, or the continuous strand may extend from one edge of the substrate to the same edge. In all cases, the length of the second carbon fibres will be dependent on the length of the continuous strand. The diameter of the second carbon fibres is typically in the range of 0.2 microns to 25 microns, preferably in the range of 2 microns to 20 microns. The final profile of the strand(s) within the substrate will depend on the number and thickness of fibres in the strand and the final thickness of the substrate. The or each continuous strand is embedded within the non-woven carbon fibre gas diffusion substrate. When more than one continuous strand is present, each continuous strand may be at an equal depth or at varying depths (i.e. variation in the z-direction) within the substrate, or a combination thereof. The continuous strand(s) may be applied at any orientation and at any spacing. The continuous strand(s) may also have applied to the surface, or impregnated within the strand, a final polymer or polymers which may be the same as or different from the final polymer in the non-woven carbon fibre gas diffusion substrate. Examples of such polymers include polytetrafluoroethylene (PTFE), fluorinated ethylene-propylene (FEP), polyvinylidene difluoride (PVDF), Viton A, polyethylene, polypropylene, ethylene-propylene. The preferred final polymer is PTFE or FEP.

The carbon based filler material comprises a mixture of a particulate carbon and one or more polymers, the carbon suitably being in the form of a powder. The carbon powder may be any of the materials generally designated as carbon black such as acetylene blacks, furnace blacks, pitch, coke-based powders and graphitised versions of such materials. Suitably also both natural and synthetic graphites may be used in this application. Such materials may be used either alone or in combination. The particulate carbon, or carbons, in the base filler material are held together by one or more polymers. The polymeric materials used will contribute to the essential electrode structural properties such as pore size distribution, hydrophobic/hydrophilic balance and physical strength of the gas diffusion layer. It is preferable that the polymer is relatively hydrophobic thereby rendering the base filler material as a whole hydrophobic. Examples of such polymers include polytetrafluoroethylene (PTFE), fluorinated ethylene-propylene (FEP), polyvinylidene difluoride (PVDF), Viton A, polyethylene, polypropylene, ethylene-propylene. The preferred polymers are PTFE or FEP.

The carbon based filler material may further comprise a catalyst other than an electrocatalyst, for example a gas phase catalytic component which is designed to remove contaminant gases in the fuel or oxidant feed streams, as for example carbon monoxide in the hydrogen fuel, when this is supplied from a reformer. The gas phase catalytic component comprises a supported or unsupported metal or mixed metal catalyst suitably active for the oxidation of carbon monoxide to carbon dioxide and which is isolated from the electrocatalytic component by the absence of any proton conducting material within the structure.

The carbon based filler material may further comprise a modifier material, or materials, which are added to the carbon based filler material in order to change the water management properties of the structure. One or more modifier materials are hydrophilic in nature relative to the carbon based filler material. Preferably, the one or more modifier materials are based on carbon, glass, silica or ceramics, which may be hollow, porous or solid and are more preferably essentially spherical or fibrous materials. By the term essentially spherical, we mean that the modifier material may be spherical, spheroidal, ellipsoidal or any shape which approximates to a sphere, spheroid or ellipsoid. By the term fibrous, we mean that the modifier material is of a fibrous nature, i.e. its length is far greater than its width or diameter; in general the fibres would not be longer than approximately 3 mm. Specific examples of the modifier material include carbon wool, quartz wool, silica micro-fibres, blown or sprayed ceramic fibres, carbon micro-spheres, glass micro-spheres, colloidal or finned silica and zeolites.

Further descriptions of the carbon based filler material and the modifier material may be found in PCT Application WO 00/55933 which is incorporated herein by reference.

The flexible non-woven carbon fibre gas diffusion substrate may be prepared by taking a pre-formed flexible non-woven carbon fibre web, in-filling with the carbon based filler material to form a substrate and subsequently hotpressing. The majority of the filler material will be forced into the structure of the non-woven carbon fibre web, although a small quantity may remain on the surface. Accordingly, a second aspect of the invention provides a process for the preparation of a flexible non-woven carbon fibre gas diffusion substrate, said process comprising the steps of (i) in-filling a flexible non-woven carbon fibre web with the carbon based filler material, and (ii) hotpressing said filled substrate under temperature and pressure.

The non-woven carbon fibre web may be made by either a wet-lay or a dry-lay process and may be made by a single individual process or by adapting a continuous manufacturing process, such as paper making or felt making, to form a continuous web. In the case of a wet-lay process, the first fibres are dispersed as a suspension in, preferably water, to form a slurry. Also added to the slurry are one or more polymers (the "first polymer"), preferably hydrophilic polymers, for example polyvinylalcohol (PVA). The first polymer may be in the form of fibres. Once first fibres and the first polymer are uniformly dispersed in the liquid, the resultant slurry is drained-through a suitable mesh in order to form a coherent layer of the non-woven fibre web. In the case of a single individual process the fibres are deposited onto a mesh in a conventional hand sheet maker. In the case of a continuous manufacturing process, a continuous structure is formed by the controlled deposition of the slurry onto a moving mesh belt. The sheet or web so-formed by either method is dried in an oven to set the first polymer. If necessary the sheet or web is placed in a solution of the final polymer, which may or may not be the same as the first polymer, allowed to dry and subsequently heat-treated to set the final polymer. If it is not desirable for the first polymer to remain in the final web structure, it may be removed by this heat treatment or by an alternative appropriate process. In addition, any undesirable residues may be removed by the heat treatment or by an alternative appropriate process.

The flexible non-woven carbon fibre web may be in-filled by the base filler material by any method known in the art. Such methods include screen printing, dip coating, nip coating, spray coating and other coating process known to those skilled in the art.

Alternatively, the flexible non-woven carbon fibre gas diffusion substrate may be prepared using a continuous manufacturing process similar to that used to prepare the non-woven carbon fibre web, wherein the carbon based filler material and where appropriate the modifier material or materials are also added to the slurry, and a continuous structure formed by the controlled deposition of the slurry onto a moving mesh belt, drying the formed gas diffusion substrate, and hotpressing said gas diffusion substrate under temperature and pressure. Accordingly, a third aspect of the invention provides a process for the preparation of a flexible non-woven carbon fibre gas diffusion substrate, said process comprising the steps of (i) dispersing the first carbon fibres, thermoplastic polymeric material and carbon based filler material as a suspension, (ii) forming a substrate by the controlled deposition of the slurry onto a moving mesh belt, (iii) drying the substrate, and (iv) hotpressing the substrate under temperature and pressure.

Suitably, the pressure used for the hotpressing step is in the range of 2500 kPa to 12000 kPa, and preferably is in the range of 3500 kPa to 10000 kPa. Suitably, the temperature used for the hotpressing step is in the range of 150° C. to 320° C., and preferably is in the range of 190° C. to 300° C.

A further aspect of the invention provides a gas diffusion electrode comprising a flexible non-woven carbon fibre gas diffusion substrate as hereinbefore described and an electrocatalyst material. The electrocatalyst material is applied as a thin layer to the surface of the gas diffusion substrate. Some of the electrocatalyst material may penetrate slightly into the substrate, the remaining material forming a layer on the surface of the substrate. The electrocatalyst material comprises one or more electrocatalytic components and a polymer. Suitable polymers include hydrophobic polymers, such as PTFE and/or proton conducting polymers, such as Nafion®. The electrocatalytic component is defined as a substance that promotes or enhances the rate of the electrochemical reaction of interest but remains unaltered by the reaction. The electrocatalytic component or components selected will depend on the application for which the gas diffusion electrode is being used. These may be, for example, a precious metal or a transition metal as the metal or metal oxide, either unsupported or supported in a dispersed form on a carbon support; an organic complex, in the form of a high surface area finely divided powder or fibre, or a combination of these options. An example of a suitable electrocatalyst material is described in EP 0 731 520.

When the non-woven carbon fibre gas diffusion substrate of the invention is used as the base structure for a gas diffusion electrode, it significantly reduces the compressibility of the substrate or electrode and consequently reduces the amount of movement experienced during compression of the stack during assembly. In stack designs with particularly wide flow field channels in the fuel and oxidant plates the tendency for the electrode or substrate to distort into the channels, restricting the gas flow, is significantly reduced. This will be of a particular advantage with fuel cell stacks operating at ambient pressure where the flow field channels are usually relatively wide.

A further aspect of the invention provides a membrane electrode assembly comprising a non-woven carbon fibre gas diffusion substrate of the invention as hereinbefore defined. Alternatively, the invention provides a membrane electrode assembly comprising a gas diffusion electrode of the invention as hereinbefore defined.

Still further aspects of the invention include (i) a fuel cell comprising a gas diffusion substrate according to the present invention, (ii) a fuel cell comprising a gas diffusion electrode according to the present invention, and (iii) a fuel cell comprising a membrane electrode assembly according to the invention.

Other applications for which one or more of the embodiments of the invention may be used, in addition to fuel cells, include, but are not limited to, metal-air batteries, electrochemical gas sensors, electrochemical reactors for the electrosynthesis of useful chemical compounds and separator mats for batteries. Non-electrochemical applications of the non-woven fibre web include, but are not limited to, composite materials for cryogenic insulation; composite reinforcement in-areas such as plastics, cements, printed circuit boards, sports goods etc, for insulation purposes, military applications, automotive structural components, brakes, gaskets, transmission units etc and for filtration applications.

The invention will now be further described with reference to the following examples.

COMPARATIVE EXAMPLE 1

A mixture of chopped carbon fibres at a fibre length of 6 mm and 12 mm (type RK 25 supplied by RK Carbon Fibres Ltd, Muir of Ord, UK) and carbon fibre wool (type Donacarbo M supplied by Osaka Gas Chemicals Co., Ltd., Osaka, Japan) were dispersed in water in the ratio of 1:1:1 to form a slurry for a wet laid paper making process.

The non-woven sheet was fabricated, on a wet-laid papermaking machine, at a width of 1 meter, utilising the slurry described above and applying a polyester binder to the sheet after formation on the wire and prior to removal from the couch roll. The web was dried to constant weight with a final processing temperature of 220° C. The formation process was adjusted to give a final sheet grammage of 16 g/m$^2$.

The 1 meter wide sheet was slit to supply three rolls at 300 mm width, and these were teflonated by passing the web continuously through a bath of PTFE emulsion (ICI Fluon dispersion GP1, 64 wt % solids suspension) diluted to give a 6% solids suspension. The coated web was dried at 180° C. and then fired to a final temperature of 375° C. to give a final loading of 35 wt % PTFE on the carbon web.

Single sheets of the teflonated carbon fibre web were cut from the 300 mm wide roll prior to impregnating with the particulate carbon fill.

The particulate material used for embedding within the fibre network was provided by dispersing 47 weight parts of acetylene black (Shawinigan black from Chevron Chemicals, Houston, Tex., USA) in 1200 parts of water. To this was added 3 weight parts of PTFE as a dispersion in water (ICI Fluon dispersion GP1, 64 wt % solids suspension) and the mixture stirred to entrain the PTFE particles within the carbon black. The resultant material was dispersed using a high shear mixer (Silverson L4R) to produce a smooth mixture.

The particulate material was pressed into the non-woven carbon fibre sheet from one side, and levelled off using a metal edge. The sheet was then dried at 200° C. for 1 minute. A further thin layer of the particulate material was applied to the same side; the structure was sandwiched between two sheets of filter paper and passed through a set of rollers to compact the layer. The sheet was then dried at 200° C. for 1 minute. This process was repeated for the second side. Further additions of thin layers of the particulate material were applied alternately to each side, with compaction and drying, until a loading of 2.2 mg/cm$^2$ of carbon was achieved. The resulting gas diffusion substrate sheet was fired, in air, to 300° C. for 30 minutes.

The resulting sheet was weighed, measured and the area calculated. The thickness was measured using a Digital Micrometer model No. M 372 (from Messmer Buchel Instruments Ltd., Gravesend, UK) with a 5 kPa preload, and the density was calculated from said data. The results are given in Table 1.

EXAMPLE 1

The filled carbon fibre web produced in Comparative Example 1 was placed between two sheets of aluminium foil which were then placed between two 1 mm sheets of titanium and placed in a heated hydraulic press. The Hydraulic press was pressurised to 1000 psig (7000 kPa) at a temperature of 190° C. for a period of 5 minutes. The resulting sheet was extracted from the press, and after removal of the aluminium foil, was measured as for Comparative Example 1, and the results presented in Table 1.

COMPARATIVE EXAMPLE 2

Comparative Example 2 was prepared as for Comparative Example 1 with the papermaking, formation process adjusted to give a final sheet grammage of 21 g/m$^2$. The application of the particulate material was adjusted to achieve a loading of 4.4 mg/cm$^2$ of carbon.

EXAMPLE 2

The filled carbon fibre web produced in Comparative Example 2 was treated at temperature and pressure as for Example 1 and was measured as for Comparative Example 1, and the results presented in Table 1.

COMPARATIVE EXAMPLE 3

Comparative Example 3 was prepared as for Comparative Example 1 with the papermaking, formation process adjusted to give a final sheet grammage of 21 g/m$^2$. The application of the particulate material was adjusted to achieve a loading of 6.8 mg/cm$^2$ of carbon.

EXAMPLE 3

The filled carbon fibre web produced in Comparative Example 3 was treated at temperature and pressure as for Example 1 and was measured as for Comparative Example 1, and the results presented in Table 1.

COMPARATIVE EXAMPLE 4

Comparative Example 4 was prepared as for Comparative Example 1 with the papermaking, formation process adjusted to give a final sheet grammage of 27 g/m². The application of the particulate material was adjusted to achieve a loading of 4.5 mg/cm² of carbon.

EXAMPLE 4

The filled carbon fibre web produced in Comparative Example 4 was treated at temperature and pressure as for Example 1 and was measured as for Comparative Example 1, and the results presented in Table 1.

COMPARATIVE EXAMPLE 5

Comparative Example 5 was prepared as for Comparative Example 1 with the papermaking, formation process adjusted to give a final sheet grammage of 21 g/m². The application of the particulate material was adjusted to achieve a loading of 4.1 mg/cm² of carbon.

EXAMPLE 5

The filled carbon fibre web produced in Comparative Example 5 was treated at temperature and pressure as for Example 1 and was measured as for Comparative Example 1, and the results presented in Table 1.

COMPARATIVE EXAMPLE 6

Comparative Example 6 was prepared as for Comparative Example 1 with the papermaking, formation process adjusted to give a final sheet grammage of 27 g/m². The application of the particulate material was adjusted to achieve a loading of 6.5 mg/cm² of carbon.

EXAMPLE 6

The filled carbon fibre web produced in Comparative Example 6 was treated at temperature and pressure as for Example 1 and was measured as for Comparative Example 1, and the results presented in Table 1.

TABLE 1

| Sample Number | Web | Weight g | Area cm² | Thickness at 5 kPa | Grammage g/cm² | Density g/cm³ |
|---|---|---|---|---|---|---|
| Comp Ex 1 | 16 g/m² Filled 2.2 mg/cm²C | 3.64 | 736.00 | 0.0207 | 0.004946 | 0.24 |
| Example 1 | 16 g/m² Filled 2.2 mg/cm²C Hotpressed | 3.64 | 736.00 | 0.0117 | 0.004946 | 0.42 |
| Comp Ex 2 | 21 g/m² Filled 4.4 mg/cm²C | 6.73 | 736.00 | 0.0382 | 0.009144 | 0.24 |
| Example 2 | 21 g/m² Filled 4.4 mg/cm²C Hotpressed | 6.73 | 736.00 | 0.0210 | 0.009144 | 0.44 |
| Comp Ex 3 | 21 g/m² Filled 6.8 mg/cm²C | 8.51 | 736.00 | 0.0494 | 0.011563 | 0.23 |
| Example 3 | 21 g/m² Filled 6.8 mg/cm²C Hotpressed | 8.51 | 736.00 | 0.0268 | 0.011563 | 0.43 |
| Comp Ex 4 | 27 g/m² Filled 4.5 mg/cm²C | 6.20 | 736.00 | 0.0358 | 0.008424 | 0.24 |
| Example 4 | 27 g/m² Filled 4.5 mg/cm²C Hotpressed | 6.20 | 736.00 | 0.0213 | 0.008424 | 0.40 |
| Comp Ex 5 | 27 g/m² Filled 4.1 mg/cm²C | 5.93 | 736.00 | 0.0350 | 0.008057 | 0.23 |
| Example 5 | 27 g/m² Filled 4.1 mg/cm²C Hotpressed | 5.93 | 736.00 | 0.0216 | 0.008057 | 0.37 |
| Comp Ex 6 | 27 g/m² Filled 6.5 mg/cm²C | 7.85 | 736.00 | 0.0448 | 0.010666 | 0.24 |
| Example 6 | 27 g/m² Filled 6.5 mg/cm²C Hotpressed | 7.85 | 736.00 | 0.0241 | 0.010666 | 0.44 |

The results shown in Table 1 demonstrate that the carbon web structure can be made across a range of grammage (and hence thickness) and subsequently filled to various loadings with the carbon/PTFE particulate material without having a significant impact on the density. However compaction under temperature and pressure produces a non recoverable change in density to figures comparable with the current rigid carbon fibre paper products.

The invention claimed is:
1. A flexible non-woven carbon fibre gas diffusion substrate comprising:
   a plurality of first carbon fibres oriented in the x-, y- and optionally z-directions, said first fibres being bonded with a thermoplastic polymeric substance, and a carbon based filler material, wherein the flexible non-woven carbon fibre gas diffusion substrate has a total density of greater than 0.35 g/cm³.

2. A flexible non-woven carbon fibre gas diffusion substrate according to claim 1, wherein the total density is greater than 0.4 g/cm³.

3. A flexible non-woven carbon fibre gas diffusion substrate according to claim 1, wherein the first carbon fibres are selected from the group consisting of longer fibres, shorter fibres, and a combination of longer and shorter fibres.

4. A flexible non-woven carbon fibre gas diffusion substrate according to claim 1, wherein one or more continuous strands comprised of a plurality of second carbon fibres is embedded within the non-woven carbon fibre gas diffusion substrate.

5. A flexible non-woven carbon fibre gas diffusion substrate according to claim 1, wherein the carbon based filler material comprises a mixture of a particulate carbon and one or more polymers.

6. A flexible non-woven carbon fibre gas diffusion substrate according to claim 1, wherein the carbon based filler material further comprises a catalyst other than an electrocatalyst.

7. A flexible non-woven carbon fibre gas diffusion substrate according to claim 1, wherein the carbon based filler material further comprises a modifier material or materials.

8. A process for the preparation of a flexible non-woven carbon fibre gas diffusion substrate according to claim 1, said process comprising the steps of:
in-filling a flexible non-woven carbon fibre web with a carbon based filler material, and (ii) hotpressing said filled substrate under a high temperature and pressure.

9. A process for the preparation of a flexible non-woven carbon fibre gas diffusion substrate according to claim 1, said process comprising the steps of:
dispersing first carbon fibres, thermoplastic polymeric material and carbon based filler material as a suspension, (ii) forming a substrate by the controlled deposition of the slurry onto a moving mesh belt, (iii) drying the substrate, and (iv) hotpressing the substrate under high temperature and pressure.

10. A process according to claim 8, wherein the substrate is hotpressed at a temperature of from 150° C. to 320° C.

11. A process according to claim 8, wherein the substrate is hotpressed at a pressure of from 2500 kPa to 12000 kPa.

12. A gas diffusion electrode comprising a flexible non-woven carbon fibre gas diffusion substrate according to claim 1 and an electrocatalyst material.

13. A membrane electrode assembly comprising a flexible non-woven carbon fibre gas diffusion substrate according to claim 1.

14. A membrane electrode assembly comprising a gas diffusion electrode according to claim 12.

15. A fuel cell comprising a flexible non-woven carbon fibre gas diffusion substrate according to claim 1.

16. A fuel cell comprising a gas diffusion electrode according to claim 12.

17. A fuel cell comprising a membrane electrode assembly according to claim 13.

* * * * *